United States Patent
Landais et al.

(10) Patent No.: US 12,200,071 B2
(45) Date of Patent: Jan. 14, 2025

(54) COMMUNICATION BETWEEN CN AND AN

(71) Applicant: NOKIA TECHNOLOGIES OY, Espoo (FI)

(72) Inventors: Bruno Landais, Pleumeur-Bodou (FR); Laurent Thiebaut, Antony (FR); Philippe Godin, Versailles (FR); Ömer Bulakci, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/025,740

(22) PCT Filed: Sep. 15, 2020

(86) PCT No.: PCT/EP2020/075685
§ 371 (c)(1),
(2) Date: Mar. 10, 2023

(87) PCT Pub. No.: WO2022/057995
PCT Pub. Date: Mar. 24, 2022

(65) Prior Publication Data
US 2023/0362267 A1 Nov. 9, 2023

(51) Int. Cl.
*H04L 67/51* (2022.01)
(52) U.S. Cl.
CPC .................. *H04L 67/51* (2022.05)
(58) Field of Classification Search
CPC ....................................................... H04L 67/51

USPC ......................................................... 709/224
See application file for complete search history.

(56) References Cited

U.S. PATENT DOCUMENTS

2022/0312182 A1* 9/2022 Venkataraman ...... H04W 76/50
2023/0336957 A1* 10/2023 Ahmadi .................. H04W 4/20

FOREIGN PATENT DOCUMENTS

| WO | 2019/068781 A1 | 4/2019 | |
| WO | 2020/057328 A1 | 3/2020 | |
| WO | WO-2020169174 A1 * | 8/2020 | ......... H04L 41/0853 |

OTHER PUBLICATIONS

International Search Report and Written Opinion dated May 19, 2021 corresponding to International Patent Application No. PCT/EP2020/075685.

(Continued)

*Primary Examiner* — Karen C Tang
(74) *Attorney, Agent, or Firm* — Nokia Technologies Oy

(57) ABSTRACT

It is provided a method comprising: inquiring a repository function to provide identifications of all producers registered in the repository function and satisfying a query condition; receiving or obtaining the identifications of all the producers registered in the repository function and satisfying the query condition upon the inquiring; requesting, using the received or obtained identifications, each of the producers to provide a service.

6 Claims, 11 Drawing Sheets

(56) References Cited

OTHER PUBLICATIONS

3GPP TS 29.510 V16.4.0 (Jul. 2020), Technical Specification, 3rd Generation Partnership Project; Technical Specification Group Core Network and Terminals; 5G System; Network Function Repository Services; Stage 3 (Release 16), Jul. 2020.
3GPP TS 23.273 V16.4.0 (Jul. 2020), Technical Specification, 3rd Generation Partnership Project; Technical Specification Group Services and System Aspects; 5G System (5GS) Location Services (LCS); Stage 2 (Release 16), Jul. 2020.
3GPP TS 23.041 V16.4.0 (Jun. 2020), Technical Specification, 3rd Generation Partnership Project; Technical Specification Group Core Network and Terminals; Technical realization of Cell Broadcast Service (CBS) (Release 16), Jun. 2020.

\* cited by examiner

COMMUNICATION BETWEEN CN AND AN

FIELD OF THE INVENTION

The present disclosure relates to communication between CN and AN (in particular RAN). It is particularly related to SBA-based communication.

Abbreviations

3GPP 3$^{rd}$ Generation Partnership Project
3G/4G/5G 3$^{rd}$/4$^{th}$/5$^{th}$ Generation
5GC 5G Core
5GS 5G System
AF Application Function
AMF Access and Mobility Management Function
AN Access Network
API Application Programming Interface
AUSF Authentication Server Function
BS Base station
CBC Cell Broadcast Center
CBCF Cell Broadcast Control Function
CN Core Network
DN Data Network
eNB evolved NodeB (4G base station)
EPS Evolved Packet System
gNB 5G base station
HTTP Hypertext Transfer Protocol
HTTPS Hypertext Transfer Protocol-Secure
ID Identity
IWF Interworking Function
LMF Location Management Function
LTE Long term evolution
MME Mobility Management Entity
MTC Machine-Type Communication
NEF Network Exposure Function
NF Network Function
NG Next Generation
NR New Radio (air interface standard of 5G systems)
NRF Network repository Function
NSSF Network Slice Selection Function
OTDOA Observed Time Difference of Arrival
PCF Policy Control Function
PLMN Public Land Mobile Network
PWS Public Warning System
RAN Radio Access Network
RAT Radio Access Technology
SBA Service-Based-Architecture
SBI Service-Based Interface
SCF Service Capability Feature
SCP Service Communication Proxy
SCTP Stream Control Transmission Protocol
SeGW Security Gateway
SMF Session Management Function
TA Tracking Area
TAI Tracking Area Identity
UDM Unified Data Management
UE User Equipment
URI Uniform Resource Identifier
URL Uniform Resource Locator
UPF User Plane Function
V2X Vehicular to everything

BACKGROUND OF THE INVENTION

5GC is defined as a Service Based Architecture. On the other hand, the interface between the Access Network (AN) and Core Network (CN) is defined as a legacy point to point interface since the very early generations of PLMN. In the 5GS, N2 is designed as a 3GPP NG-C Application Protocol over SCTP, between the gNB (or ng-eNB) and the AMF (Access and Mobility management function). This is shown in FIG. 1.

The following problems have been identified with the legacy point to point interface and protocol between the AN and CN:

The interface relies on a 3GPP specific protocol (NG Application protocol messages encoded in ASN-1), which is not as cloud-friendly, easy to deploy and open as Web technologies such as HTTP based APIs;

It assumes fixed communicating peers ("point-to-point interface") and a fixed set of functionalities, which does not allow easy and fast roll-out of new functionalities.

It does not allow services to deployed independently from each other, which limits the scalability of the AN by not enabling services to be scaled up and down easily and flexibly.

It does not enable different functionalities to be placed flexibly and independently in the network, e.g., take into account different service requirements.

Maintaining a 3GPP system consisting of cloud native and non-cloud native protocols in predominantly cloud based environment causes complexities and costs for operators to deploy and operate.

In a Service-oriented architecture (SOA) (or service-based architecture), services are provided to the other components by application components, through a communication protocol over a network. A SOA service is a discrete unit of functionality that can be accessed remotely and acted upon and updated independently. SOA is also intended to be independent of vendors, products and technologies.

A service has four properties according to one of many definitions of SOA:

1. It logically represents an activity with a specified outcome.

2. It is self-contained.

3. It is a black box for its consumers, meaning the consumer does not have to be aware of the service's inner workings.

4. It may consist of other underlying services.

In existing 3GPP systems (e.g. 5G System), all communications (including non-UE specific signalling) between any CN NF and AN need to go through the Access and Mobility Management function (e.g. AMF in 5GS). This causes:

AMF processing overhead (the AMF is a critical NF already very solicited for handling mobility of all UEs)

Signalling latency (need to traverse an extra NF, that may prioritize more sensitive requests);

Implementation complexity (for the AMF) and unnecessary coupling with features for which the AMF need not be involved (also implying that addition of new features might also require AMF upgrade);

Risk of such signalling being throttled during AMF overload.

Lack of flexibility in how CN can distribute service requests towards the AN, e.g. for PWS services (AMF can only distribute requests based on list of TAIs).

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: inquire a repository function to provide identifications of all producers registered in the repository function and satisfying a query condition; receive or obtain the identifications of all the producers registered in the repository function and satisfying the query condition upon the inquiring; request, using the received or obtained identifications, each of the producers to provide a service.

According to a second aspect of the invention, there is provided an apparatus comprising: one or more processors, and memory storing instructions that, when executed by the one or more processors, cause the apparatus to: provide a fan-out request to a proxy function; monitor if a response indication is received from the proxy function upon providing the fan-out request; retrieve a result of a service provided by a producer if the response indication is received; wherein the fan-out request comprises a query condition, a query parameter, and an indication of the service; the query parameter indicates that the service is requested from all producers satisfying the query condition.

According to a third aspect of the invention, there is provided an apparatus comprising: one or more processors, and memory storing instructions that, when executed by the one or more processors, cause the apparatus to: monitor if a repository function receives a request to provide identifications of all producers registered in the repository function and satisfying a query condition; instruct the repository function to provide the identifications of all the producers registered in the repository function and satisfying the query condition if the request is received.

According to a fourth aspect of the invention, there is provided a method comprising: inquiring a repository function to provide identifications of all producers registered in the repository function and satisfying a query condition; receiving or obtaining the identifications of all the producers registered in the repository function and satisfying the query condition upon the inquiring; requesting, using the received or obtained identifications, each of the producers to provide a service.

According to a fifth aspect of the invention, there is provided a method comprising: providing a fan-out request to a proxy function; monitoring if a response indication is received from the proxy function upon providing the fan-out request; retrieving a result of a service provided by a producer if the response indication is received; wherein the fan-out request comprises a query condition, a query parameter, and an indication of the service; the query parameter indicates that the service is requested from all producers satisfying the query condition.

According to a sixth aspect of the invention, there is provided a method comprising: monitoring if a repository function receives a request to provide identifications of all producers registered in the repository function and satisfying a query condition; instructing the repository function to provide the identifications of all the producers registered in the repository function and satisfying the query condition if the request is received.

Each of the methods of the fourth to sixth aspects may be a method of service based communication.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:

Cleaner and simplified network architecture, where AMF does not need to be involved for non-UE specific signaling interactions between any CN NF and the AN. I.e., AMF may be bypassed for non-UE specific signaling interactions.

No AMF processing overhead for functionalities that do not require AMF involvement (critical NF that is already very solicited for handling mobility of all UEs) shorter signalling latency Simplify AMF implementation and decoupling with features for which the AMF need not be involved.

No risk of such signalling being throttled during AMF overload.

Greater flexibility in how the service request issued by a CN NF can be distributed towards the AN, e.g. not only based on TAI but possibly also on other broadcast area identifiers such as Emergency Area ID.

Fanning out of signaling requests may be delegated to SCP (or another entity). Thus, service consumers (such as CBCF) need not be adapted to support fanning out.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
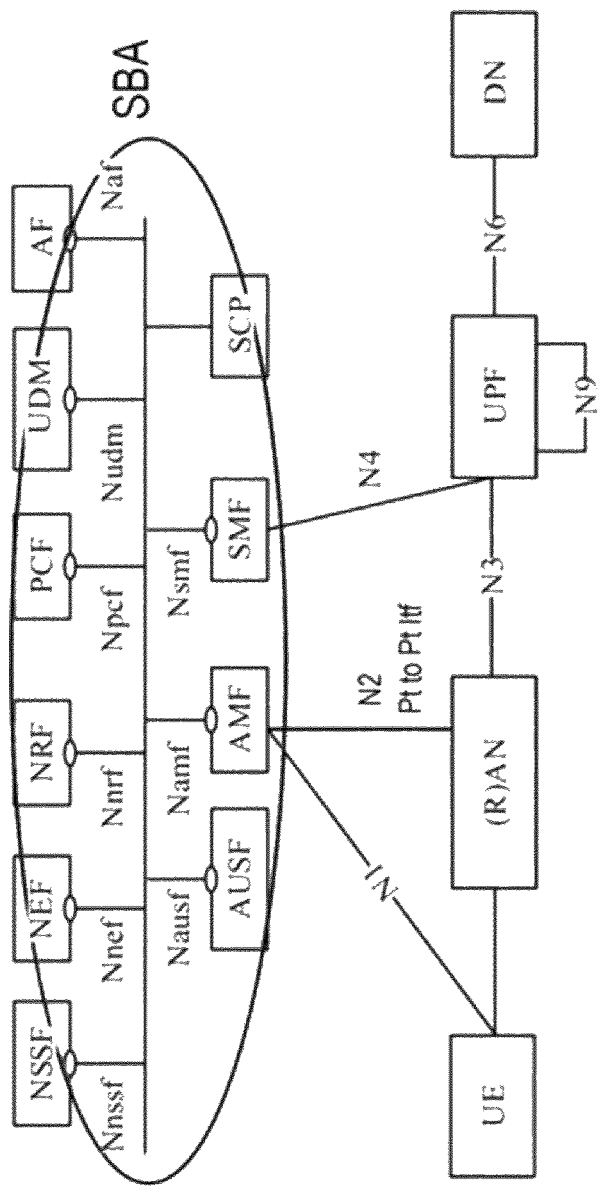
FIG. 1 shows a 5G network.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of this invention address non-UE specific signalling interactions/procedures between the AN and CN if the interface is service-based. Example use cases are:

Signalling interactions between the CN (CBCF or PWS-IWF) and AN (gNB, ng-eNB) for Public Warning System (PWS) messages broadcast Non-UE specific location management procedures between the CN (LMF) and AN (gNB, ng-eNB), e.g. for LMF to obtain Non-UE Associated Network Assistance Data (see clause 6.11.3 of 3GPP TS 23.273).

Some example embodiments of the invention enable to support non-UE specific service requests being exchanged between any CN (Core Network) NF (Network Function) and the AN (Access Network). Since the requests are service based, they may bypass the Access and Mobility Management function or any similar CN function. In particular, some example embodiments of the invention enable to fan-out a service request towards multiple recipients, e.g. to fan-out a PWS service request towards multiple AN nodes corresponding to the intended broadcast area of the warning message.

The solution includes the following technical aspects:

1) The solution enables communication between any CN NF and the AN bypassing the Access and Mobility Management function (e.g. AMF in the 5GS), for non-UE specific signalling. The communication may be direct or indirect through a Service Communication Proxy (SCP).

Example use cases:

signalling interactions between the CBCF (Cell Broadcast Control Function) and the 5G-AN for PWS (Public Warning System as defined in 3GPP TS 23.041), Positioning procedures between LMF (Location Management Function) and AN for the LMF to obtain Non-UE Associated Network Assistance Data (see clause 6.11.3 of 3GPP TS 23.273).

2) The AN supports new services (i.e. new APIs) that it exposes to NF service consumers (e.g. CBCF, LMF). In one embodiment, the AN supports the following services according to Table 1. Note that the names used for services, variables etc. are just examples and do not limit the invention. This applies throughout the whole application.

TABLE 1

Some services supported by AN according to some example embodiments of the invention.

| Service Name | Description | Example Consumer |
|---|---|---|
| Nan_PWS | AN service to start or overwrite the broadcasting of warning messages, or to cancel an already ongoing broadcast of a warning message. | CBCF |
| Nan_NRPPa Transport | AN service to obtain assistance data from an NG-RAN node to support OTDOA positioning for any UE | LMF |

The service based architecture may operate bi-directional. I.e., in some example embodiments, CN NFs supports services (i.e. new APIs) that it exposes to NF service consumers (e.g. AN). In one example embodiment, the CN supports the following service according to Table 2:

TABLE 2

A service supported by CN according to some example embodiments of the invention.

| Service Name | Description | Example Consumer |
|---|---|---|
| Ncbcf_PWS | CN service to inform the CBCF that PWS information for some or all cells of the NG-RAN node may be reloaded from the CBC if needed, | AN |

3) When being operative, the AN registers the services it supports, to support the above non-UE specific service requests, in the NRF, and any AN setup or configuration information that would be known to AMF in legacy 5GS, such as information indicating that the AN is operative, the list of TAIs (Tracking Area Identity), PLMN IDs, Emergency Area IDs or RATs (Radio Access Technology) it supports.

Likewise, the CN NFs may register the services they support in NRF to support non-UE specific service requests.

4) The CN NF sends a service (HTTP) request targeting the requested AN service (e.g. new PWS service/API). For non-UE specific service requests that need to be sent to multiple NF service producers (e.g. different AN nodes), the solution includes:

a) the CN NF (consumer) discovering all the producers to which it wants to send the request, by sending an NF Discovery Request to the NRF, with a new query parameter (e.g. "full-search: true") indicating that all producers satisfying the query condition(s) are requested to be discovered. This results in the NRF returning all such producers in the NF discovery response, or in the NRF storing the result of the service discovery response in a given URL and in providing the URI of this URL in the Discovery Response to enable the consumer to retrieve them all in a subsequent GET request (see searchId and numNfInstComplete attributes in Table 6.2.6.2.2-1 of 3GPP TS 29.510). The CN NF (consumer) then sends a service request towards each of the discovered producer.

or b) the CN NF (consumer) sending the service request to a SCP, including new information (e.g. a new HTTP custom header or new values within the already defined 3gpp-Sbi-Discovery-*) to request the recipient (SCP) to fan-out the request towards all the producers satisfying the fan-out condition(s) indicated in the request (e.g. indicated in the new fan-out header). The SCP discovers the NF producers matching the criteria (e.g. all AN nodes serving a list of TAIs) and fans out the request towards all of them. The SCP sends a single response to the CN NF consumer acknowledging that the fan-out request has been handled.

The fan-out condition(s) may include e.g. a list of TAIs or Emergency Area IDs.

Figure 2:
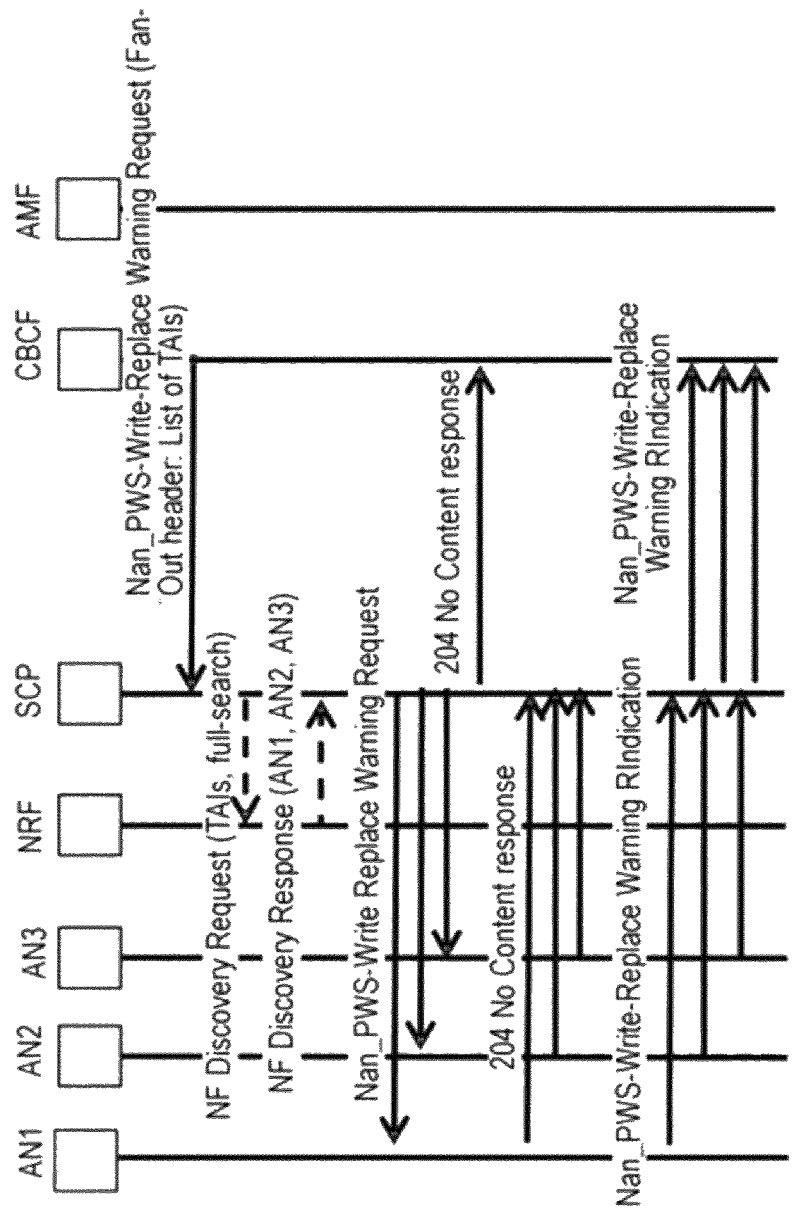
FIG. 2 shows a message flow according to some example embodiments of the invention.
Figure 3:
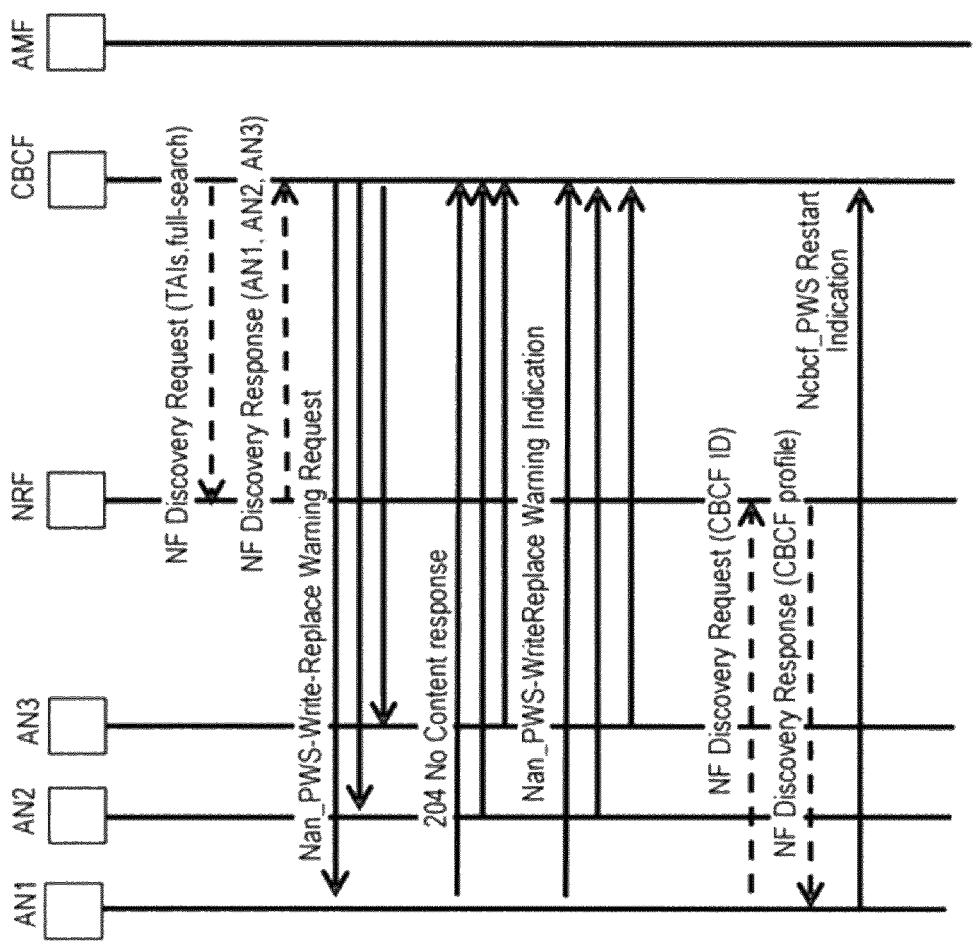
FIG. 3 shows a message flow according to some example embodiments of the invention.
Figure 4:
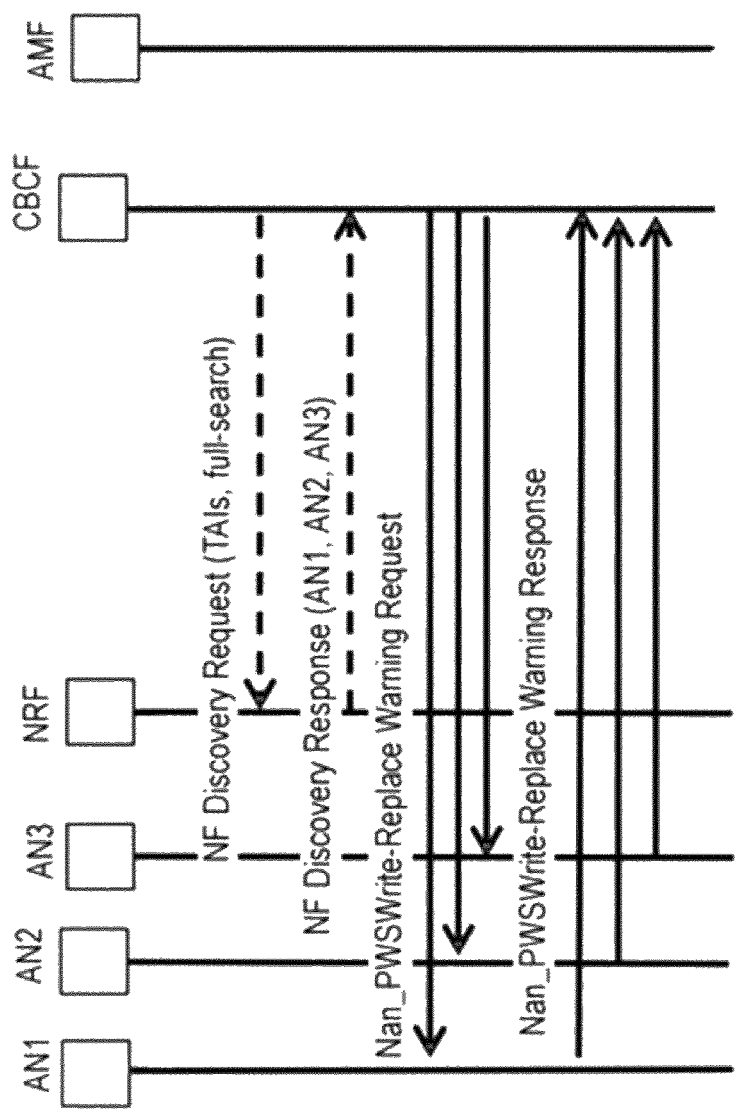
FIG. 4 shows a message flow according to some example embodiments of the invention.

FIGS. 2, 3, and 4 provide message flows according to some example embodiments of the invention using the above mechanisms, for PWS, where the CN (e.g. CBCF) needs to start or stop the broadcast of a warning message in a broadcast area (e.g. a list of TAIs and/or Emergency Area IDs).

In the call flow of FIG. 2:

CBCF sends a Write-Replace-Warning Request to SCP. The Write-Replace-Warning request indicates the TAIs to which the SCP should forward the Write-Replace-Warning request. The Write-Replace-Warning request sent to the SCP also includes information requesting the SCP to fan-out the request to every producer serving the TAIs. In addition, the Write-Replace-Warning request comprises a callback URI. It indicates the address from where CBCF will retrieve the Write-Replace Warning (Response) Indication.

Upon receipt of the Write-Replace-Warning request, SCP sends a discovery request to NRF. The discovery request comprises the list of TAIs received from CBCF and a query parameter (e.g. full search=TRUE), indicating that NRF should provide identifiers of all ANs within the indicated TAIs.

NRF provides the identifiers of all the ANs in the indicated TAIs because the discovery request comprises the query parameter full search=TRUE.

SCP forwards the Write-Replace-Warning Request to all the ANs (here: AN1, AN2, and AN3) indicated by the NRF in response to the discovery request. In addition, it replies to CBCF with a message 204 ("No content response").

Each of the ANs replies to the SCP by a message 204 ("No content response"). In addition, they provide their response (comprising content=outcome of the Write-Replace-Warning Request for the respective AN, such as a warning indication) by sending a Write-Replace Warning Indication towards the callback URI.

SCP forwards these indications to CBCF without aggregating them. CBCF may then retrieve the content provided by the ANs from the Write-Replace Warning Indication messages received at its callback URI.

FIG. 3 shows the same communication without involvement of an SCP. In this case, CBCF queries NRF directly, and communicates directly with the ANs.

FIG. 4 provides a possible alternative call flow to that of FIG. 3, where the ANs include the outcomes of the PWS request in the Write-Replace Warning Response (rather than providing it at a callback URI and providing a Write-Replace Warning Indication). In this case, the Write-Replace-Warning Request may not comprise a callback URI.

Figure 5:
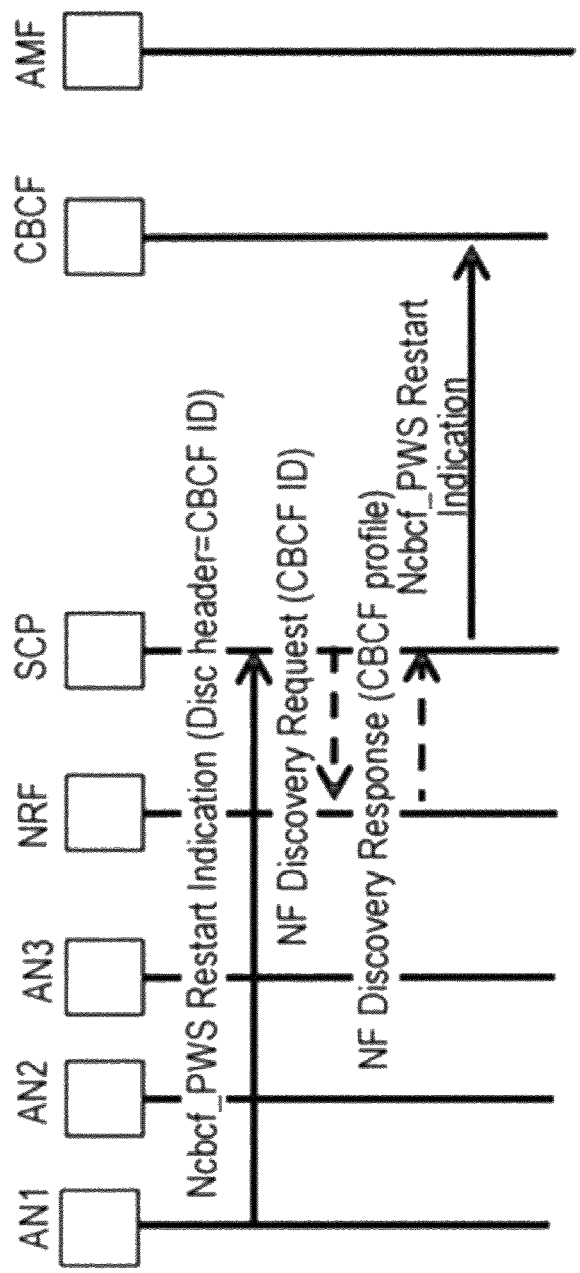
FIG. 5 shows a message flow according to some example embodiments of the invention.

FIG. 5 shows another message flow according to an example embodiment of the invention. As shown in FIG. 5, a PWS Restart Indication sent by the AN is to be distributed to several CBCFs. Such a distribution may be necessary if different CBCFs control warning messages to be broadcasted in the AN, e.g. one CBCF for tsunami, one CBCF for nuclear issues, one CBCF for forest fire). The Ncbcf_PWSRestart Indication in FIG. 5 may include new information (e.g. a new HTTP custom header or new values within the already defined 3gpp-Sbi-Discovery-*) to request the recipient (SCP) to fan-out the request towards all the producers satisfying the fan-out condition(s) indicated in the request (e.g. indicated in the new fan-out header). Upon receipt of the Ncbcf_PWSRestart Indication, SCP sends an NF Discovery Request towards the NRF to discover all CBCFs fulfilling a respective query condition. Therefore, the NF discovery request may also include a query parameter (e.g. "full-search: true") indicating that all producers satisfying the query condition(s) are requested be discovered. As a result, NRF will return all producers (CBCFs) fulfilling the query condition. SCP may than forward the Ncbcf_PWSRestart Indication to the CBCFs indicated by NRF.

FIG. 5 corresponds to FIG. 2, wherein the roles of CN and AN are interchanged. Correspondingly, the message flows of FIGS. 3 and 4 may be applied in the reverse direction (AN: requester; CN: producer), too. As an example, the last line of FIG. 3 shows that AN1 may directly provide a Ncbcf_PWSRestart Indication to (one or more) CBCFs. Of course, CN is not limited to CBCF but other core network elements may apply corresponding message flows.

In the above described example embodiments, CBCF represents a core network function. Instead of a CBCF (5GS), a CBC (4G networks (EPS)), or any corresponding function in other core networks may be used. CBC/CBCF is just one example of a core network function and the invention is not limited to this particular core network function.

Some example embodiments of the invention provide greater flexibility than the prior art in discovering and selecting the AN nodes. The discovery and selection may be based not only on TAIs (that is only supported in legacy EPS and 5GS) but also based e.g. on Emergency Area IDs, where each AN node would register the Emergency Area ID it supports in its profile in the NRF.

As a possible alternative to an SCP, a new CN NF may be defined to support fanning out an incoming request to multiple requests, e.g. to distribute a PWS request targeting a list of TAIs to all AN nodes serving the list of TAIs. As a still further alternative, any existing CN NF may take over the part of the SCP.

According to some example embodiments, the SCP does NOT aggregate responses received from the AN (e.g. the responses from AN1 to AN3 in FIG. 2). This is another simplification compared to the prior art. In legacy EPS and 5GS, the MME or AMF needs not only to fan-out the PWS requests towards all the AN nodes serving a list of TAIs, but also to aggregate all the responses into a single response towards the CBC/CBCF. In particular, the SCP need not to wait for responses from all producers (ANs) before it may forward the response of each producer to the consumer (CN NF).

5) AN sends a service (HTTP) request targeting the requested CN NF service.

The AN may either discover itself the CN NF by interacting with the NRF, or it may delegate the discovery and selection of the CN NF to an SCP. In the latter case, the AN includes in the service request (e.g. PWS Restart Indication) it sends to the SCP the necessary discovery condition(s) to discover the recipient CN NF. This may include e.g. the target CN NF ID or CN NF Set ID (e.g. CBCF ID or CBCF Set ID), and possibly other query condition(s), e.g. the TAIs of the AN node. SCP retrieves NF profile from NRF (if needed) and routes the request to a CN NF service instance.

Figure 6:
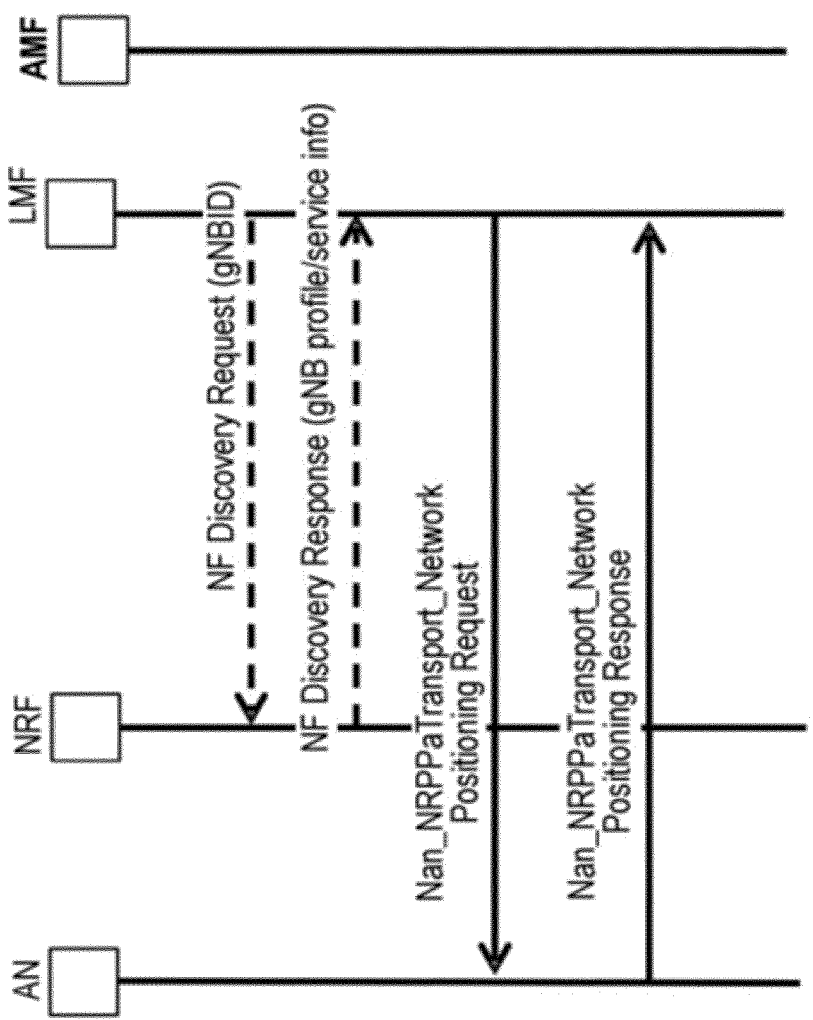
FIG. 6 shows a message flow according to some example embodiments of the invention.
Figure 7:
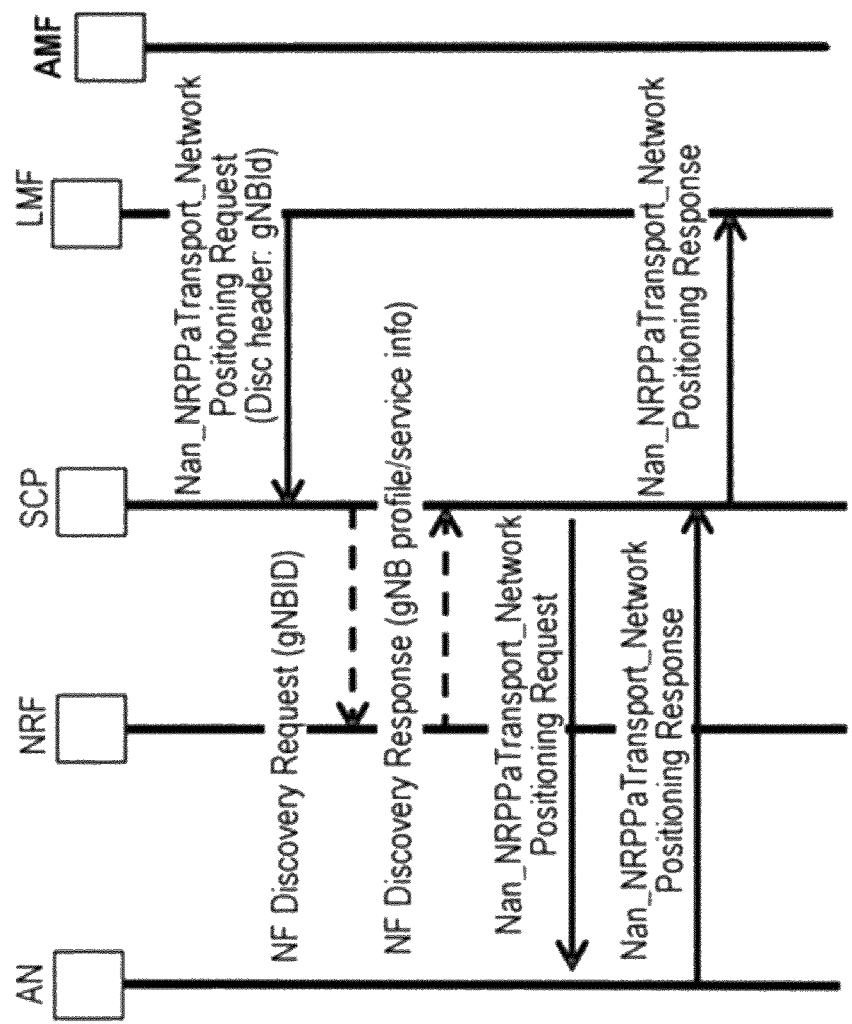
FIG. 7 shows a message flow according to some example embodiments of the invention.

FIGS. 6 and 7 provide other example call flows for LMF (Location Management) to obtain Non-UE Associated Network Assistance Data (see clause 6.11.3 of 3GPP TS 23.273). This includes a AN Node ID (e.g. gNB ID) query condition for the NF Discovery request and a new HTTP discovery header or new value within the already defined 3gpp-Sbi-Discovery-*) including an AN Node ID (e.g. gNB ID). For the call flows of FIGS. 6 and 7, it is assumed as a starting point that the LMF has determined the AN Node ID (e.g. gNB ID) for which it needs to obtain Non-UE Associated Network Assistance Data. The call flow of FIG. 6 is direct between LMF and NRF/AN, while the call flow of FIG. 7 has an intermediate SCP for discovering and communicating with the AN.

Figure 8:
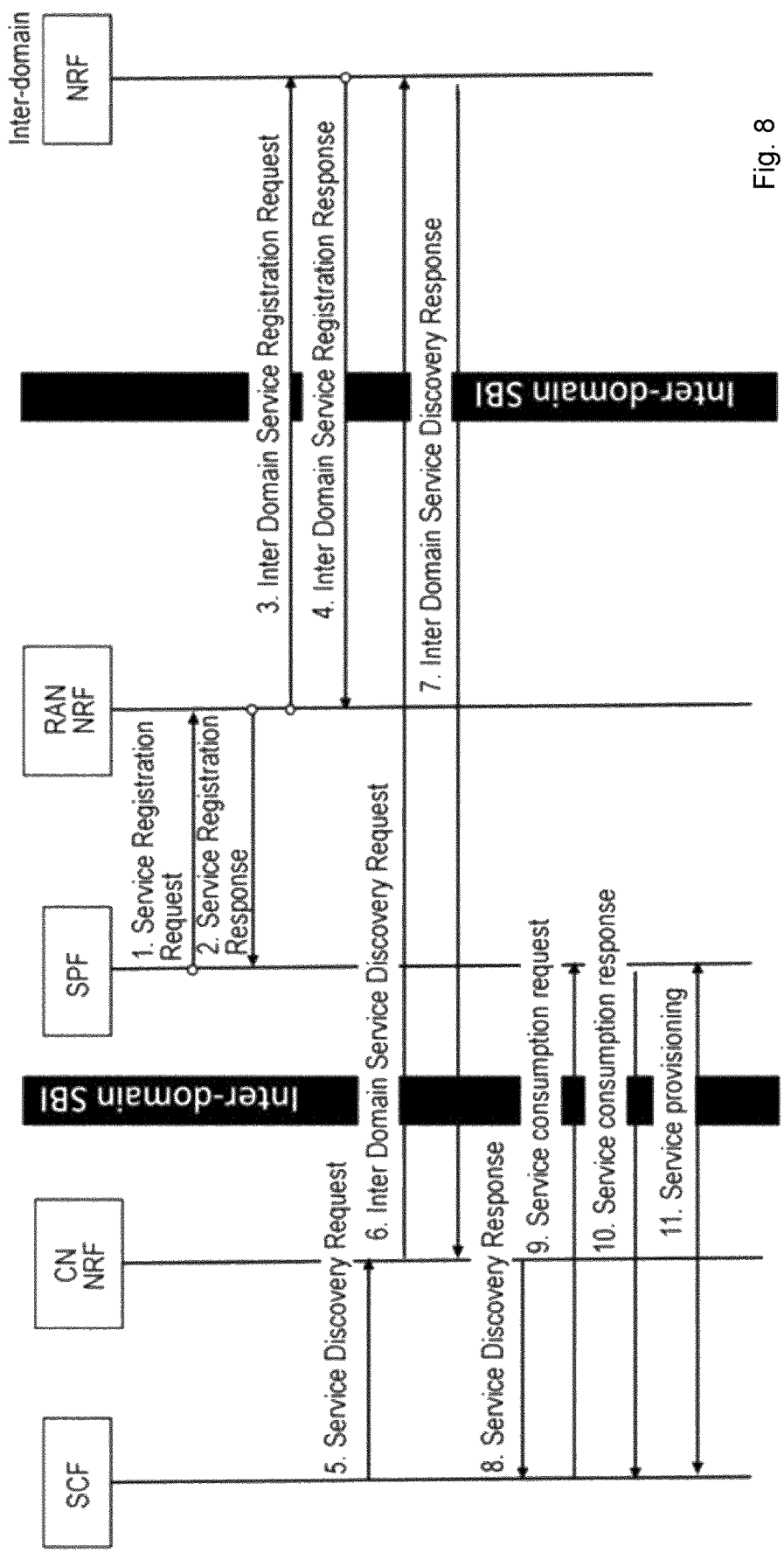
FIG. 8 shows a message flow according to some example embodiments of the invention.

6) Utilization of domain-specific NRFs and Inter-Domain NRF:

In the example embodiments, the same or different NRFs may be used for the registration and discovery of the AN and CN services, e.g. an NRF in the AN for AN services, an NRF in the CN for CN services, or a common NRF. In some example embodiments, the NRFs are distributed, e.g., RAN NRF and CN NRF, along with an inter-domain NRF. In such example embodiments, as depicted in FIG. 8, the NFs can register their services to the corresponding domain NRFs (see Steps 1 and 2 in FIG. 8). The services that can be exposed to/can be relevant to other domains can be registered at the inter-domain NRF (see Steps 3 and 4 in FIG. 8). Accordingly, whenever there is a service discovery request (see Step 5 in FIG. 8), of which corresponding service is not provided within the same domain, such service discovery request can be directed to the inter-domain NRF (see Step 6 in FIG. 8), where the corresponding information for the service consumption is provided by the inter-domain to the domain-specific NRF (see Step 7 in FIG. 8) and in-turn to the SCF (see Step 8 in FIG. 8). Thereafter, the SCF and SPF can communicate with each other for the aimed service (see Steps 9, 10, 11 in FIG. 8).

In some example embodiments, the inter-domain NRF can proxy/forward registration and/or discovery requests across domains. The communication between the NFs in different domains can be performed over an inter-domain SBI.

Figure 9:
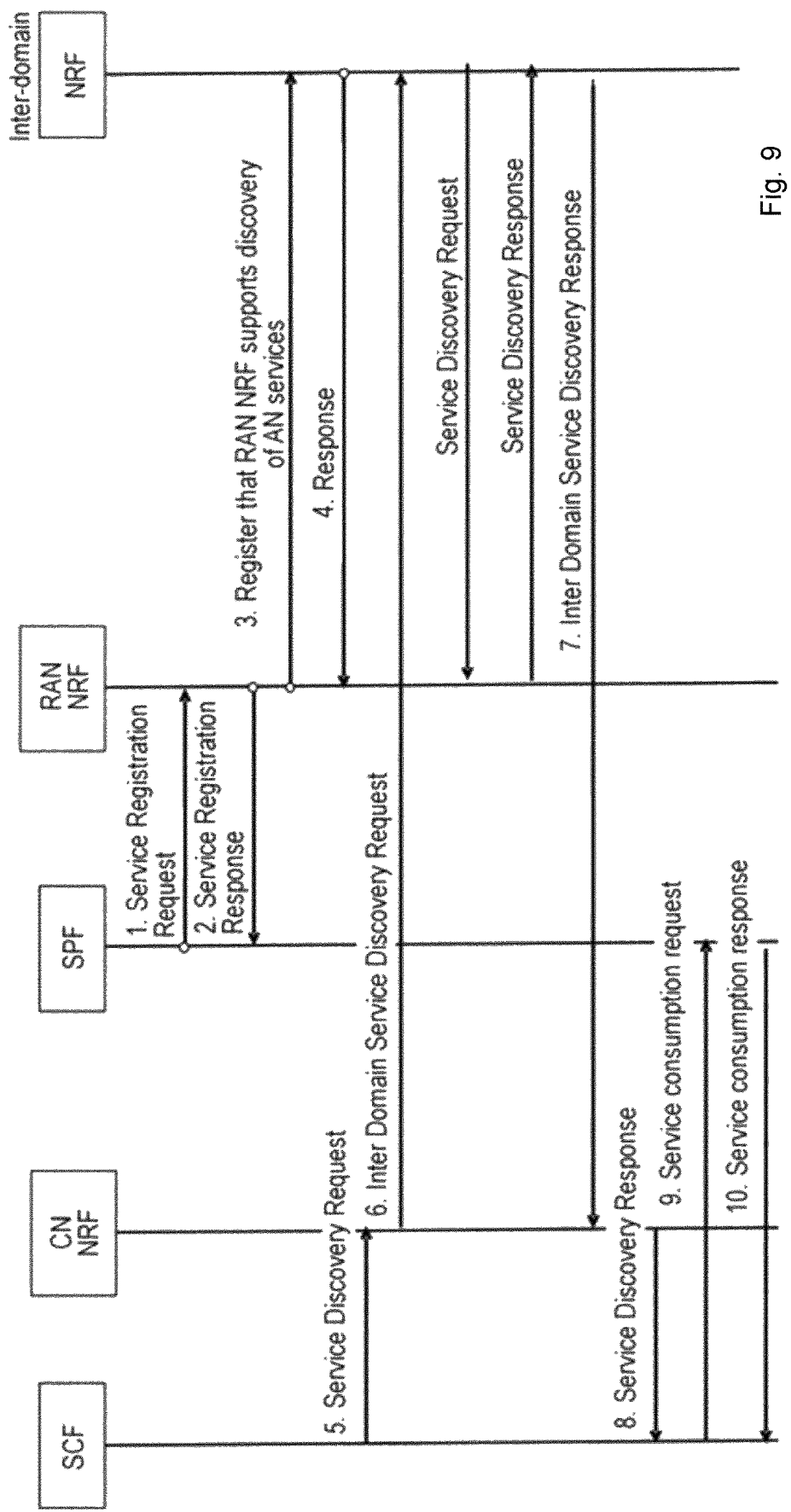
FIG. 9 shows a message flow according to some example embodiments of the invention.

In some example embodiments, as shown in FIG. 9, the RAN NRF may only register in the inter-domain NRF that RAN-NRF supports the registration and discovery of AN services, with optional parameters further describing the AN services registered in the RAN NRF e.g. AN services for specific TAIs. Likewise, the CN NRF may register in the inter-domain NRF that it supports the registration and discovery of CN services, with optional parameters further describing the CN services registered in the RAN NRF e.g. CN services for specific AMF sets.

A CN request to discover an AN service may then be sent to the inter-domain NRF, possibly via the CN NRF, and the inter-domain NRF forwards the discovery (or subscription) request towards the appropriate AN NRF. The AN NRF returns the discovery response that is then forwarded back to the requester NF.

Likewise, an AN request to discover an CN service may then be sent to the inter-domain NRF, possibly via the AN NRF, and the inter-domain NRF forwards the discovery (or subscription) requests towards the appropriate CN NRF. The CN NRF returns the discovery response that is then forwarded back to the requester AN node.

Steps 3 and 4 of FIG. 9 may occur only when the RAN NRF needs to modify the description of the AN services that it can serve, e.g. if the RAN NRF needs to register a new TA.

Figure 11:
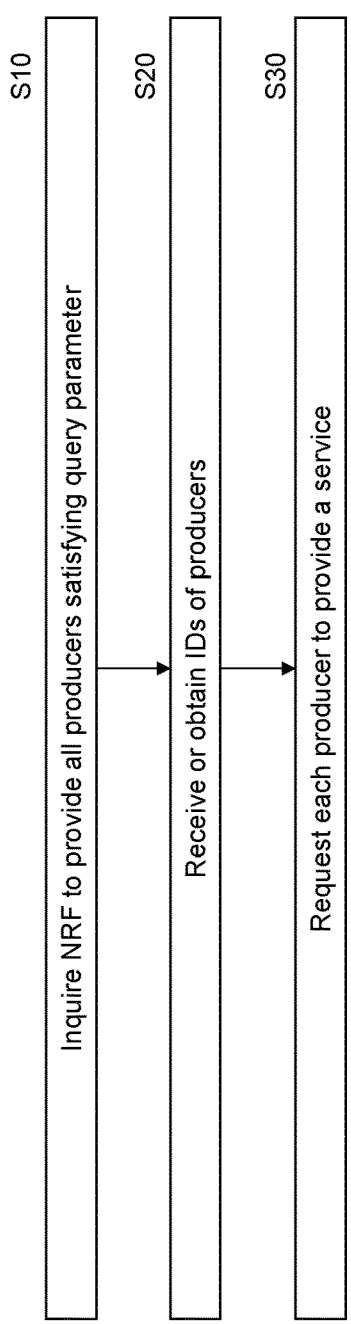
FIG. 11 shows a method according to an example embodiment of the invention.
Figure 10:
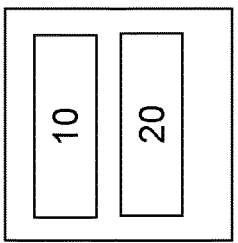
FIG. 10 shows an apparatus according to an example embodiment of the invention.

FIG. 10 shows an apparatus according to an example embodiment of the invention. The apparatus may be a core network function (e.g. CBCF, LMF), or an SCP, or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for inquiring 10, means for receiving 20, and means for requesting 30. The means for inquiring 10, means for receiving 20, and means for requesting 30 may be an inquiring means, receiving means, and requesting means, respectively. The means for inquiring 10, means for receiving 20, and means for requesting 30 may be an inquirer, receiver, and requestor, respectively. The means for inquiring 10, means for receiving 20, and means for requesting 30 may be an inquiring processor, receiving processor, and requesting processor, respectively.

The means for inquiring 10 inquires a repository function to provide identifications of all producers registered in the repository function and satisfying a query condition (S10). The inquiry may comprise one or plural query conditions. If the inquiry comprises plural query conditions, they may be conjoint by logical "AND" or "OR". Accordingly, the repository function is requested to provide identifications of all producers registered in the repository function and satisfying all the plural query conditions and satisfying at least one of the plural query conditions, respectively. A query condition may or may not comprise a logical NOT.

The means for receiving 20 receives or obtains the identifications of all the producers provided by the repository function (S20) upon the inquiring (S10). I.e., the means for receiving 20 receives the identifications if the repository function provides the identifications to the apparatus in response to the inquiry. On the other hand, if the repository function stores the identifications at an URL (storage device), the means for receiving 20 obtains the identifications from the URL upon the inquiring (S10).

The means for requesting 30 requests each of the producers to provide a service (S30). For these requests, the means for requesting 30 uses the received or obtained identifications of S20.

Figure 13:
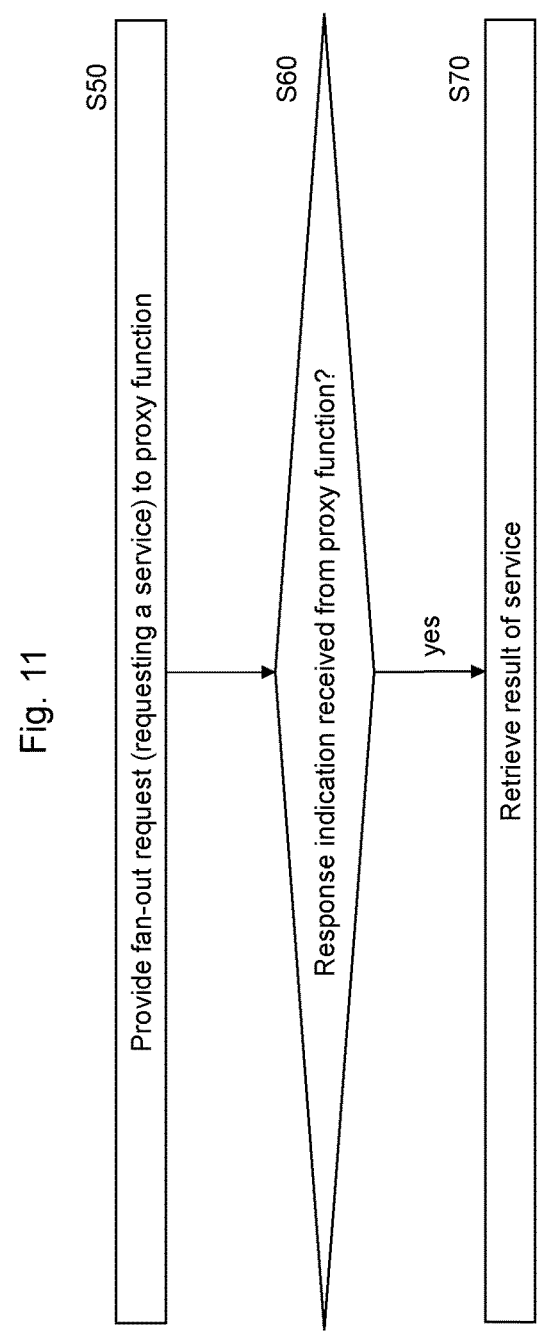
FIG. 13 shows a method according to an example embodiment of the invention.
Figure 12:
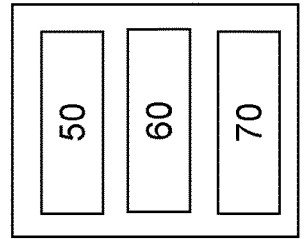
FIG. 12 shows an apparatus according to an example embodiment of the invention.

FIG. 12 shows an apparatus according to an example embodiment of the invention. The apparatus may be a network function (e.g. a core network function or an access network function), or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for providing 50, means for monitoring 60, and means for retrieving 70. The means for providing 50, means for monitoring 60, and means for retrieving 70 may be a providing means, monitoring means, and retrieving means, respectively. The means for providing 50, means for monitoring 60, and means for retrieving 70 may be a provider, monitor, and retriever, respectively. The means for providing 50, means for monitoring 60, and means for retrieving 70 may be a providing processor, monitoring processor, and retrieving processor, respectively.

The means for providing 50 provides a fan-out request to a proxy function (S50). The fan-out request comprises a query condition, a query parameter, and an indication of the service. The query parameter indicates that the service is requested from all producers satisfying the query condition.

The fan-out request may comprise one or plural query conditions. If the fan-out request comprises plural query conditions, they may be conjoint by logical "AND" or "OR". Accordingly, the proxy function is requested to provide identifications of all producers registered satisfying all the plural query conditions and satisfying at least one of the plural query conditions, respectively. A query condition may or may not comprise a logical NOT.

The means for monitoring 60 monitors if a response indication is received from the proxy function upon providing the fan-out request (S60).

If the response indication is received (S60=yes), the means for retrieving 70 retrieves a result of a service provided by a producer (S70).

Figure 15:
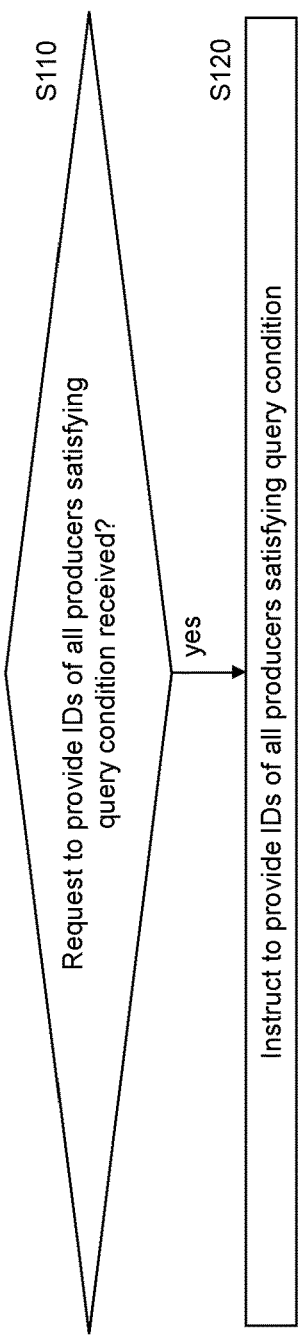
FIG. 15 shows a method according to an example embodiment of the invention.
Figure 14:
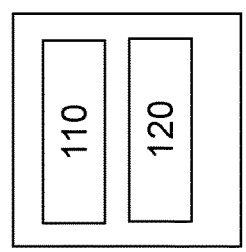
FIG. 14 shows an apparatus according to an example embodiment of the invention.

FIG. 14 shows an apparatus according to an example embodiment of the invention. The apparatus may be a repository function (e.g. NRF), or an element thereof. FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for monitoring 110 and means for instructing 120. The means for monitoring 110 and means for instructing 120 may be a monitoring means and instructing means, respectively. The means for monitoring 110 and means for instructing 120 may be a monitor and instructor, respectively. The means for monitoring 110 and means for instructing 120 may be a monitoring processor and instructing processor, respectively.

The means for monitoring 110 monitors if a repository function receives a request to provide identifications of all producers registered in the repository function and satisfying a query condition (S110). The request may comprise one or plural query conditions. If the request comprises plural query conditions, they may be conjoint by logical "AND" or "OR". Accordingly, the repository function is requested to provide identifications of all producers registered in the repository function and satisfying all the plural query conditions and satisfying at least one of the plural query conditions, respectively. A query condition may or may not comprise a logical NOT.

If the request is received (S110=yes), the means for instructing 120 instructs the repository function to provide the identifications of all the producers registered in the repository function and satisfying the query condition (S120).

Figure 16:
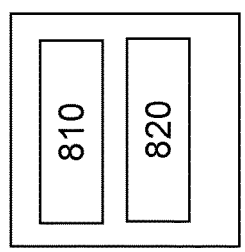
FIG. 16 shows an apparatus according to an example embodiment of the invention.

FIG. 16 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 11, 13, and 15 and related description.

Some example embodiments are explained with respect to a 5G network. However, the invention is not limited to 5G. It may be used in 3G or 4G networks and 3GPP networks of future generations. It is not even limited to 3GPP networks. It may be used in other wireless or wired access networks (e.g. WiFi networks) and corresponding core networks.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

A gNB is an example of an element of an access network, in particular of a radio access network, to which some example embodiments of the invention are applicable. Another example is a eNB.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, an access network function, in particular a radio access network function such as a base station (such as a gNB or eNB) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a core network function such as a SCP etc., or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a repository function such as a NRF, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
one or more processors; and
at least one memory storing instructions that, when executed by the one or more processors, cause the apparatus to:
inquire a repository function to provide identifications of producers registered in the repository function and satisfying query conditions, wherein the query conditions comprise that the producer serves a tracking area and the producer serves an emergency area;
receive or obtain the identifications of the producers registered in the repository function and satisfying the query condition upon the inquiring; and
request, using the received or obtained identifications, each of the producers to provide a service, wherein communication between the apparatus, the repository function, and the producers bypasses an access and mobility management function and the communication is direct or indirect through a service communication proxy,
wherein the apparatus comprises a proxy function and the instructions, when executed by the one or more processors, further cause the apparatus to:
determine reception of a fan-out request from a network function, wherein
the fan-out request comprises a fan-out header along with the query conditions, a query parameter, and an indication of the service;
the query parameter indicates that the identifications of all the producers satisfying the query conditions are to be inquired; and
based on determining that the fan-out request is received, inquire the repository function is based on the fan-out request.

2. The apparatus according claim 1, wherein
the apparatus is configured to provide a core network function, and the service is an access network service; or the apparatus is configured to provide an access network service, and the service is a core network function, and wherein
the core network function is different from at least one of an access management function and a mobility management function.

3. The apparatus according to claim 1, wherein the instructions, when executed by the one or more processors, further cause the apparatus to:
upon the inquiring, receive an address indication indicating an address where the identifications of all the producers are stored; wherein,
upon the receiving the address indication, the identifications of all the producers are obtained from the indicated address.

4. A method, comprising:
inquiring, via a core network function, a repository function to provide identifications of all producers registered in the repository function and satisfying a query condition, wherein the query conditions comprise that the producer serves a tracking area and the producer serves an emergency area;
receiving or obtaining the identifications of all the producers registered in the repository function and satisfying the query condition upon the inquiring; and
requesting, using the received or obtained identifications, each of the producers to provide a service, wherein communication between the core network function, the repository function, and the producers bypasses an access and mobility management function and the communication is direct or indirect through a service communication proxy,
the method further comprising:
determining reception of a fan-out request from a network function, wherein
the fan-out request comprises the query conditions, a query parameter, and an indication of the service;
the query parameter indicates that the identifications of all the producers satisfying the query conditions are to be inquired; and
based on determining that the fan-out request is received inquiring the repository function based on the fan-out request.

5. The method according claim 4, wherein
the method is performed by a core network function, and the service is an access network service; or the method is performed by an access network service, and the service is a core network function and
the core network function is different from at least one of an access management function and a mobility management function.

6. The method according to claim 4, further comprising:
upon the inquiring, receiving an address indication indicating an address where the identifications of all the producers are stored; wherein,
upon the receiving the address indication, the identifications of all the producers are obtained from the indicated address.

* * * * *